O. MONGEAU.
DOOR-STOP SCREW.
No. 190,776.                  Patented May 15, 1877.
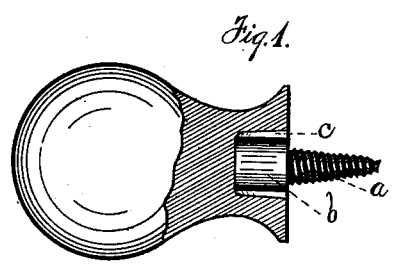
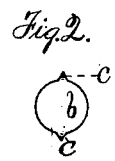
WITNESSES:
Robt F. Gaylord
A. W. Page
INVENTOR:
O. Mongeau
By W. E. Simonds,
Att'y.

UNITED STATES PATENT OFFICE.

OFTER MONGEAU, OF TORRINGTON, CONNECTICUT.

IMPROVEMENT IN DOOR-STOP SCREWS.

Specification forming part of Letters Patent No. 190,776, dated May 15, 1877; application filed March 9, 1877.

*To all whom it may concern:*

Be it known that I, OFTER MONGEAU, of Torrington, in the county of Litchfield and State of Connecticut, have invented certain new and useful improvements pertaining to a Door-Stop Screw, of which the following is a specification, reference being had to the accompanying drawings, where—

Figure 1 is a view in central longitudinal section of a door-stop with the screw inserted therein. Fig. 2 is an upper end view of the screw.

The screw $a$ has cast upon it a cylindrical, or it may be polygonal, head, $b$, of considerable length, provided with the wings $c$.

A hole is bored in the bottom of the door-stop, just a trifle smaller in diameter than the diameter of said head, and the head of the screw is driven tightly into the hole. The length of the head of the screw gives bearing on the sides of the hole sufficient to maintain the screw in position while being driven, by means of the rotating of the door-stop, and the wings prevent the head of the screw from turning or working loose in the door-stop.

I am aware that in the patent of December 14, 1875, No. 171,078, there is shown and claimed a headless screw, having wings upon a portion of its body above the thread, and adapted to enter a knob; but such a screw lacks an element of strength and security in the absence of a head.

I claim as my invention—

The screw $a$, having cast upon it a head, $b$, with wings $c$, and combined with a knob having a hole to receive said head, substantially as shown and described.

OFTER MONGEAU.

Witnesses:
    J. F. CALHOUN,
    OTTO ABELING.